US009923921B1

(12) United States Patent
Grafi

(10) Patent No.: US 9,923,921 B1
(45) Date of Patent: Mar. 20, 2018

(54) DISARMING MALWARE IN DIGITALLY SIGNED CONTENT

(71) Applicant: VOTIRO CYBERSEC LTD., Tel-Aviv (IL)

(72) Inventor: Aviv Grafi, Ramat Gan (IL)

(73) Assignee: Votiro Cybersec Ltd., Tel Aviv (IL)

( * ) Notice: Subject to any disclaimer, the term of this patent is extended or adjusted under 35 U.S.C. 154(b) by 0 days.

(21) Appl. No.: 15/795,021

(22) Filed: Oct. 26, 2017

Related U.S. Application Data

(60) Provisional application No. 62/473,902, filed on Mar. 20, 2017, provisional application No. 62/450,605, filed on Jan. 26, 2017, provisional application No. 62/442,452, filed on Jan. 5, 2017.

(51) Int. Cl.
| | |
|---|---|
| H04L 29/06 | (2006.01) |
| H04L 9/32 | (2006.01) |
| H04L 9/14 | (2006.01) |
| H04L 9/30 | (2006.01) |
| H04L 9/00 | (2006.01) |

(52) U.S. Cl.
CPC .......... H04L 63/145 (2013.01); H04L 9/006 (2013.01); H04L 9/14 (2013.01); H04L 9/30 (2013.01); H04L 9/3226 (2013.01); H04L 9/3247 (2013.01); H04L 63/1425 (2013.01)

(58) Field of Classification Search
CPC ......... H04L 63/145; H04L 9/006; H04L 9/14; H04L 9/30; H04L 9/3226; H04L 9/3247; H04L 63/1425
See application file for complete search history.

(56) References Cited

U.S. PATENT DOCUMENTS

| | | |
|---|---|---|
| 4,654,484 A | 3/1987 | Reiffel et al. |
| 5,164,839 A | 11/1992 | Lang |
| 6,324,334 B1 | 11/2001 | Morioka et al. |
| 7,185,017 B1 | 2/2007 | Cauvin et al. |
| 7,263,561 B1 | 8/2007 | Green et al. |
| 7,797,743 B2 | 9/2010 | Treacy et al. |
| 8,180,837 B2 | 5/2012 | Lu et al. |
| 8,185,954 B2 | 5/2012 | Scales |
| 8,533,824 B2 | 9/2013 | Hutton |

(Continued)

FOREIGN PATENT DOCUMENTS

WO WO 2011014623 2/2011

OTHER PUBLICATIONS

NPL Deep Instinct (Certificate Bypass: Hiding and Executing Malware from a Digitally Signed Executable, Aug. 2016, 15 pages) Year: 2016).*

(Continued)

*Primary Examiner* — Oleg Korsak
(74) *Attorney, Agent, or Firm* — Finnegan, Henderson, Farabow, Garrett & Dunner LLP

(57) ABSTRACT

Systems and methods for disarming malicious code in digitally-signed content are provided. An example method includes determining that content is associated with a first digital signature, modifying at least a portion of digital values of the content to disable any malicious code included in the content, thereby creating modified content, and signing the modified content with a second digital signature, thereby creating signed modified content, the signed modified content including a data element corresponding to the first digital signature.

24 Claims, 4 Drawing Sheets

(56) References Cited

U.S. PATENT DOCUMENTS

| | | |
|---|---|---|
| 8,745,742 B1 | 6/2014 | Satish et al. |
| 8,756,432 B1* | 6/2014 | Chen .................... G06F 21/565 |
| | | 713/187 |
| 8,763,128 B2 | 6/2014 | Lim et al. |
| 8,869,283 B2 | 10/2014 | Scales |
| 9,038,174 B2 | 5/2015 | Hutton |
| 9,047,293 B2 | 6/2015 | Grafi et al. |
| 9,330,264 B1 | 5/2016 | Hutton |
| 9,516,045 B2 | 12/2016 | Scales |
| 2003/0229810 A1 | 12/2003 | Bongo |
| 2005/0246534 A1* | 11/2005 | Kirkup .................... H04L 51/38 |
| | | 713/170 |
| 2005/1025704 | 11/2005 | Bushman et al. |
| 2007/0056035 A1 | 3/2007 | Copley |
| 2007/1008776 | 4/2007 | Hardy et al. |
| 2008/0209551 A1 | 8/2008 | Treacy et al. |
| 2009/0150419 A1 | 6/2009 | Kim et al. |
| 2009/0282484 A1 | 11/2009 | Wiseman et al. |
| 2010/0115620 A1 | 5/2010 | Alme |
| 2010/0154063 A1* | 6/2010 | Hutton .................. G06F 21/562 |
| | | 726/24 |
| 2012/0167206 A1 | 6/2012 | Reetz-Lamour et al. |
| 2013/0081065 A1 | 3/2013 | Sharon et al. |
| 2014/0032505 A1* | 1/2014 | Grafi ................ G06F 17/30076 |
| | | 707/691 |
| 2016/0191531 A1 | 6/2016 | Perlmutter et al. |

OTHER PUBLICATIONS

NPL OPSWAT (90 Data Sanitization Engines to Prevent Unknown Threats, Oct. 22, 2016, 6 pages) (Year: 2016).*

\* cited by examiner

| ID | DATE | User Name/Email | To | Comment/Subject | Sanitized File Name | Sanitized File | Original File | Status | Approve |
|---|---|---|---|---|---|---|---|---|---|
| ☐ 213 | 05.01.17 03:05 | def@abc.com | abc@def.com | Hello | 277a88d1-17ae-4945-85aa-944/0fb3e302.eml | ☒ | ☒ | △ | ✓ |
| ☐ 212 | 05.01.17 03:04 | def@abc.com | ghi@def.com | Check this out | 8131c2d9-259a-4c8b-b536-038da72e8a3f.eml | ☒ | ☒ | ☺ | ✓ |
| ☐ 211 | 05.01.17 03:04 | def@abc.com | jkl@xyz.com | Tomorrow's Meeting | e2fdb69b-afdb-44aa-8ca-1615389ab697.eml | ☒ | ☒ | ⊗ | ✗ |

FIG. 4

DISARMING MALWARE IN DIGITALLY SIGNED CONTENT

PRIORITY CLAIM

This disclosure claims priority under 35 U.S.C. § 119 to U.S. provisional patent application No. 62/442,452, filed on Jan. 5, 2017, U.S. provisional patent application No. 62/450,605 filed on Jan. 26, 2017, and U.S. provisional patent application No. 62/473,902 filed on Mar. 20, 2017. Each of the aforementioned applications is incorporated herein by reference in its entirety.

BACKGROUND

Malware-based attacks pose significant risks to computer systems. Malware includes, for example, any malicious content, code, scripts, active content, or software designed or intended to damage, disable, or take control over a computer or computer system. Examples of malware include computer viruses, worms, trojan horses, ransomware, spyware, shellcode, etc. Malware may be received into a computer system in various ways, commonly through electronic communications such as email (and its attachments) and downloads from websites. Computer systems am known to implement various protective tools at end-user computer devices and/or gateways or access points to the computer system for screening or detecting malicious content before the malicious content is allowed to infect the computer system. Conventional tools commonly rely on the ability to identify or recognize a particular malicious threat or characteristics known to be associated with malicious content or activity.

For example, common attempts to identify malicious content include screening incoming documents at a host computer or server based on a comparison with known malicious signatures. Such signature-based malware detection techniques, however, are incapable of identifying malicious content for which a malicious signature has not yet been identified. Accordingly, it is generally not possible to identify new malicious content or subtle variations of existing malicious content using signature-based detection methods. Furthermore, in many cases, malicious content is embedded in otherwise legitimate content, documents or files having proper structure and characteristics, and the malicious content may also be disguised to hide the malicious nature of the content, so that the malicious content appears to be innocuous. Thus, even upon inspection of a document according to known malware scanning techniques, it may be difficult to identify malicious content.

Other conventional tools for identifying malicious content implement behavior-based techniques or heuristics to identify characteristics of known malicious content or other suspicious activity or behavior. One such technique implements a "sandbox," (e.g., a type of secured, monitored, or virtual operating system environment) which can be used to execute untested or untrusted programs, files, or code in a manner that eliminates or reduces risk of harm to a host machine or operating system. That is, conventional sandbox techniques may execute or detonate a file while monitoring the damage or operations post-detonation. Some operations that may be monitored included operations for writing to disk, initiating network activity, the spawning of new processes and any other potentially suspicious operations. These techniques, however, also suffer from the inability to identify new yet-to-be-identified exploits, e.g., so called zero-day exploits. Some sophisticated malware have also been developed to evade such "sandbox" techniques by halting or skipping if it detects that it is running in such a virtual execution or monitored environment. Furthermore, clever hackers consistently evolve their code to include delayed or staged attacks that may not be detected from evaluation of a single file, for example, or may lay in wait for a future unknown process to complete an attack. Thus, in some situations it may be too computationally intensive or impracticable to identify some malware exploits using conventional sandbox techniques.

Other tools that help overcome limitations of conventional malware detection techniques have recently been implemented and include those based on a concept of content disarm and reconstruction (CDR), or content sanitization, which generally refers to techniques for analyzing or deconstructing content, removing aspects of the content that pose risks, and reconstructing the content to be at least partly usable by an end user. Other techniques exist for changing a format of the content, for example, to hopefully destroy any malicious content that may be part of the received content. Such CDR techniques aim to remove or disarm any malicious content that may be included in content and do not necessarily require prior detection of malicious content in the received content. Thus, CDR techniques may provide an advantage for protecting computer systems from yet-to-be identified attacks.

Some CDR processes result in the creation of modified content, or content that differs in one or more ways from the content entering a computer system on which a CDR technique is performed. In some systems, use of a CDR technique creates a modified file. While it may be advantageous to perform a CDR process on all content received by or entering a computer system to prevent malicious content from infecting the computer system, there are some significant use cases where this may be undesirable. For example, some computer systems may receive a significant volume of digitally signed content as part of its regular course of business. For these systems, a digital signature serves to authenticate not only the sender but also enables authentication of the message by validating that the received message is unchanged from when the digital signature was created. But if a received digitally signed file is modified by a CDR process implemented at a receiving computer system, validation of the received content will necessarily fail. Thus, a receiving entity will be unable to verify the authenticity of the content of any message received into the computer system that has been processed using a CDR technique. And any sort of selective CDR processing of digitally signed content also risks harm to the system because of potential mistakes in the selection process.

Current systems do not provide capabilities for performing CDR processes on received content that has been digitally signed without eliminating the benefits of the digital signature. Thus, there is a need in computer systems for techniques to mitigate the risks posed by malware attacks using a CDR process for digitally signed content, while attaining the advantages that digital signatures provide.

SUMMARY

In the following description certain aspects and embodiments of the present disclosure will become evident. It should be understood that the disclosure, in its broadest sense, could be practiced without having one or more features of these aspects and embodiments. It should also be understood that these aspects and embodiments are examples only.

The disclosed embodiments include a method for disarming malicious code in digitally-signed content. The method may be performed by a processor of a computer system and includes operations for determining that content is associated with a first digital signature, modifying at least a portion of digital values of the content to disable any malicious code included in the content, thereby creating modified content, and signing the modified content with a second digital signature, thereby creating signed modified content, the signed modified content including a data element corresponding to the first digital signature.

The disclosed embodiments also include a method for disarming malicious code in a computer system. The method includes operations for determining that input content associated with a recipient in a network is associated with a first digital signature, communicating with an authentication service to verify authenticity of the first digital signature, modifying at least a portion of digital values of the input content to disable any malicious code included in the input content, thereby creating modified input content, and signing the modified input content with a second digital signature, thereby creating signed modified input content, the signed modified input content including one or more elements indicative of the authenticity of the first digital signature.

In accordance with additional embodiments of the present disclosure, a computer-readable medium is disclosed that stores instructions that, when executed by a processor(s), causes the processor(s) to perform operations consistent with one or more disclosed methods.

The disclosed embodiment also include a system for disarming malicious code in digitally-signed content. The system includes a memory device storing a set of instructions, and a processor configured to execute the set of instructions to perform operations consistent with one or more disclosed methods.

It is to be understood that both the foregoing general description and the following detailed description are by example and explanatory only, and are not restrictive of the disclosed embodiments, as claimed.

BRIEF DESCRIPTION OF THE DRAWINGS

The subject matter regarded as the invention is particularly pointed out and distinctly claimed in the concluding portion of the specification. The disclosed principles, however, both as to organization and method of operation, together with objects, features, and advantages thereof, may best be understood by reference to the following detailed description when read with the accompanying drawings in which:

FIG. 4 is an example interface, consistent with the disclosed embodiments.

Figure 1:
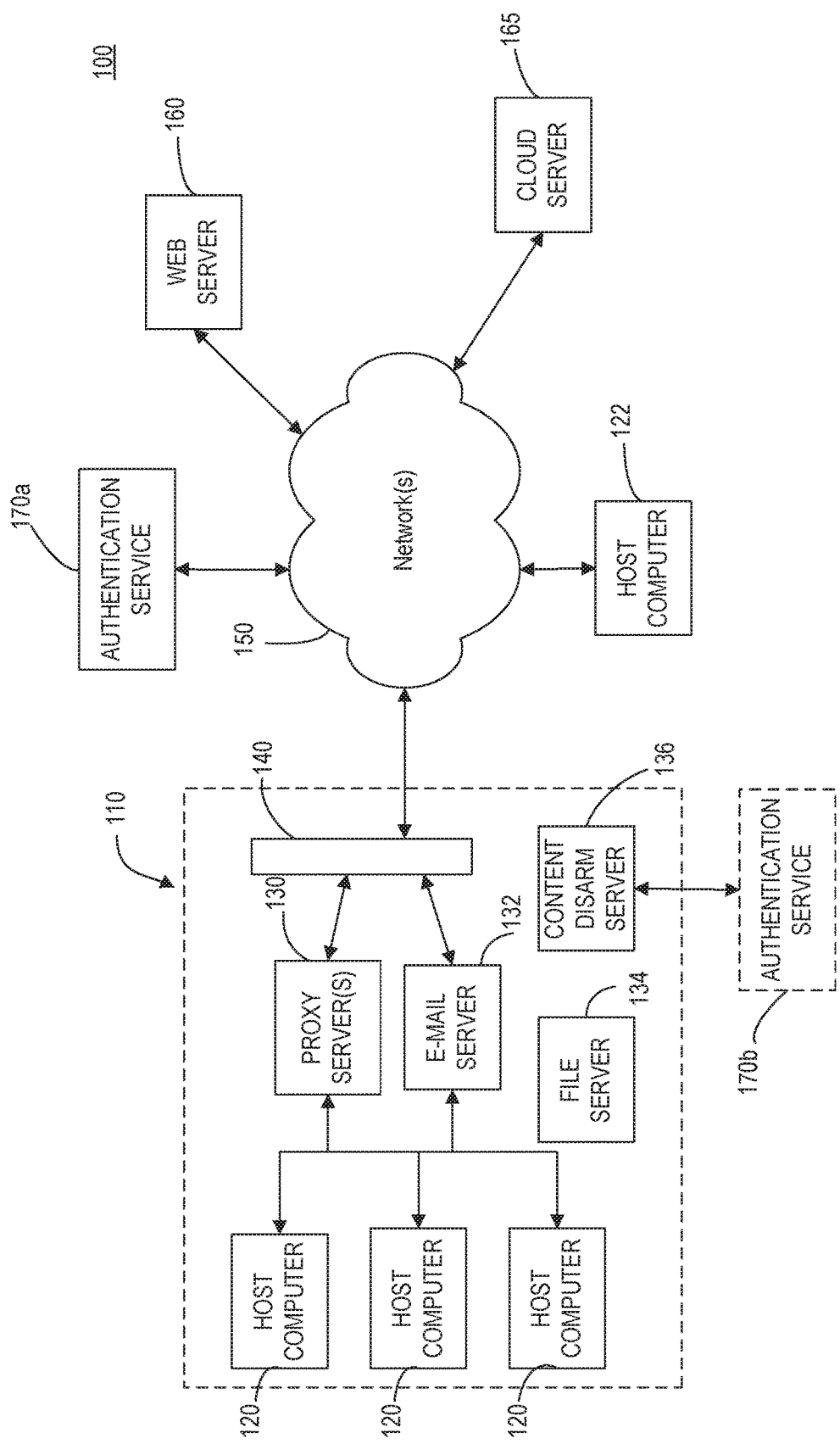
FIG. 1 is a schematic block diagram of an example computing environment consistent with the disclosed embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence. Additionally, some of the described embodiments or elements thereof can occur or be performed simultaneously, at the same point in time, or concurrently.

One technique hackers use to obtain control of a victim computer or computing environment is through the execution of malicious code at the victim computer or computing environment using malicious content received into a computer system via electronic files and electronic communications, such as via email, for example. The malicious code may be any form of malware including computer viruses, worms, trojan horses, ransomware, spyware, shellcode, etc. The disclosed embodiments implement techniques for disarming, sanitizing, or otherwise preventing malicious content from entering a computer system via received electronic content. In the disclosed embodiments, any (or all) input content received by a computer system may be modified or transformed to thereby generate modified input content in which any malicious code included in the input content is excluded, disarmed, or otherwise prevented from causing its intended malicious effects. The modified input content may then be sent to an intended recipient instead of the original input content or until the original input content may be deemed safe for releasing to the intended recipient. In some embodiments, the original input content may be stored in a protective storage area and thus may be considered to be quarantined in the computer system, such that any malicious content in the original input content is unable to attack the computer system.

The disclosed embodiments implement techniques for creating modified content from received original content that has been digitally signed. The disclosed embodiments also implement techniques that realize some of the same benefits for the modified content that a digital signature provides. Each of the disclosed embodiments need not provide all the same benefits for the modified content that a digital signature provides. For example, some disclosed embodiments include techniques for assuring a recipient or holder that the data of the modified content originated from a validated sender or provider. Additionally, some disclosed embodiments include additional or alternative techniques for assuring the integrity of the data of the received original content. Some disclosed embodiments include techniques for disarming any malicious code in digitally signed received content without necessarily verifying a digital signature associated with the received original content.

Digitally signed content may include any content associated with a digital signature. A digital signature in the disclosed embodiments may include any information appended to or associated with received content that is capable of verifying (or being used to verify) an identity of a sender and/or integrity of a message or content of the received content.

In some embodiments, a digital signature may be formed based on a mathematical one-way function called a hash that makes a unique signature based on the originating source data. Thus, identical content should hash to the same value when using the same one-way function. Due to this property, a comparison of resulting hash values can be used to determine whether any changes have been made to content. Examples of known hashing methods include Message Digest algorithm series (e.g., MD5, MD6 etc.) and Secure Hash Algorithm series (e.g., SHA-1, SHA-2 etc.).

In some embodiments, a digital signature may also be formed using a public key infrastructure (PKI) system that can enable a recipient to verify the identity of the sender. The PKI system is built on the concept of asymmetric cryptography which includes a private, secret key and a public key that corresponds to the private key. A principle of asymmetric private/public key cryptography is that anyone can use the public key to decrypt something encrypted with the private key. The ability to decrypt a message using a public key can verify a signature that only a private key could have created. If the private key is kept secured and is verifiable as belonging to a particular sender, a recipient can be reasonably assured that only the particular sender in possession of the private key could have sent the encrypted message.

In some embodiments, a digital signature may be based on a hash of the content that is also encrypted using a sender's private key. Such a digital signature can be used to verify the identity of the sender based on successful decryption of a received hash. And the hash value can be used to verify the data of the content has remained unchanged. Other techniques for generating a digital signature can be used. For example, in the disclosed embodiments a digital signature may be based on the content itself, or a hash, or other characteristic of the original input content. In the disclosed embodiments, validation of a digital signature in whatever form may generally enable a computer system to verify that the content is received from a particular sender and/or to verify that the content itself was received unchanged. Any one or more techniques known in the art for creating and validating a digital signature may be used. Thus, the disclosed embodiments may be implemented according to any particular digital signature technique.

The disclosed embodiments also implement techniques for tracking the digitally signed content or other types of content received by the computer system, and associating the content (or copies or characteristics thereof) and its digital signature with the respective generated modified content that may be passed on to an intended recipient. The content may be quarantined in the computer system or otherwise prevented from being received or accessed by an intended recipient, so that malicious content that may be included in the content is unable to infect the computer system. Because the disclosed embodiments may associate digitally signed content with respective modified content, the disclosed techniques also enable a computer system to produce the digitally signed content upon demand, if needed, such as with respect to a legal proceeding or for any other purpose for which the digitally signed content is requested.

The disclosed embodiments may be associated with or provided as part of a data sanitization or CDR process for sanitizing or modifying electronic content, including electronic mail or files or documents or web content received at a victim computer or a computer system, such as via e-mail or downloaded from the web, etc. The disclosed embodiments may implement any one or more of several CDR techniques applied to received content based on the type of content, for example, or other factors. Some example CDR techniques that may be implemented together with the disclosed embodiments include document reformatting or document layout reconstruction techniques, such as those disclosed in U.S. Pat. No. 9,047,293, for example, the content of which is expressly incorporated herein by reference. Additional example CDR techniques include those for altering values of digital content, such as those disclosed in copending U.S. patent application Ser. Nos. 15/441,860 and 15/441,904, filed Feb. 24, 2017, and techniques for preventing automatic execution of active content, such as that disclosed in U.S. application Ser. No. 15/616,577, filed Jun. 7, 2017, the contents of each of which are also expressly incorporated herein by reference.

The disclosed embodiments may implement one or more CDR processes to generate the modified input content without regard to whether malicious content is detected in the input content and without regard to whether the original input content is even analyzed by one or more malware detection techniques. The content disarming or sanitization techniques of the disclosed embodiments thus may prevent malware infection without malware detection. In some embodiments, however, one or more malware detection techniques may be implemented in association with receiving input content and generating modified input content.

Reference is now made to FIG. 1, which is a block diagram of an example computing environment 100, consistent with example embodiments of the present disclosure. As shown, system 100 may include a plurality of computing systems interconnected via one or more networks 150. A first network 110 may be configured as a private network. The first network 110 may include a plurality of host computers 120, one or more proxy servers 130, one or more e-mail servers 132, one or more file servers 134, a content disarm server 136, and a firewall 140. In some embodiments, first network 110 may optionally include an authentication service 170b, which may be part of or collocated with other elements of network 110 or otherwise connected to network 110, such as via content disarm server 136, as shown for example. Any of proxy server 130, e-mail server 132, or firewall 140 may be considered an edge or gateway network device that interfaces with a second network, such as network 150. In some embodiments, content disarm server 136 may be configured as an edge or gateway device. When either of these elements are configured to implement one or more security operations for network 110, it may be referred to as a security gateway device. Host computers 120 and other computing devices of first network 110 may be capable of communicating with one or more web servers 160, cloud servers and other host computers 122 via one or more additional networks 150.

Networks 110 and 150 may comprise any type of computer networking arrangement used to exchange data among a plurality of computing components and systems. Network 110 may include a single local area network or a plurality of distributed interconnected networks and may be associated with a firm or organization. The interconnected computing systems of network 110 may be within a single building, for example, or distributed throughout the United States and globally. Network 110, thus, may include one or more private data networks, a virtual private network using a public network, one or more LANs or WANs, and/or any other suitable combination of one or more types of networks, secured or unsecured.

Network(s) 150 may comprise any type of computer networking arrangement for facilitating communication between devices of the first network 110 and other distributed computing components such as web servers 160, cloud servers 165, authentication service 170*a*, or other host computers 122. Web servers 160 and cloud servers 165 may include any configuration of one or more servers or server systems interconnected with network 150 for facilitating communications and transmission of content or other data to the plurality of computing systems interconnected via network 150. In some embodiments, cloud servers 165 may include any configuration of one or more servers or server systems providing content or other data specifically for the computing components of network 110. Network 150 may include the Internet, a private data network, a virtual private network using a public network, a Wi-Fi network, a LAN or WAN network, and/or other suitable connections that may enable information exchange among various components of system 100. Network 150 may also include a public switched telephone network ("PSTN") and/or a wireless cellular network.

Host computers 120 and 122 may include any type of computing system configured for communicating within network 110 and/or network 150. Host computers 120, 122 may include, for example, a desktop computer, laptop computer, tablet, smartphone and any other network connected device such as a server, server system, printer, as well as other networking components.

File server 134 may include one or more file servers, which may refer to any type of computing component or system for managing files and other data for network 110. In some embodiments, file server 134 may include a storage area network comprising one or more servers or databases, or other configurations known in the art.

Content disarm server 136 may include one or more dedicated servers or server systems or other computing components or systems for performing aspects of the example processes including disarming and modifying input content. Accordingly, content disarm server 136 may be configured to perform aspects of a CDR solution, as well as perform other known malware mitigation techniques. Content disarm server 136 may be provided as part of network 110, as shown, or may be accessible to other computing components of network 110 via network 150, for example. In some embodiments, some or all of the functionality attributed to content disarm server 136 may be performed in a host computer 120. Content disarm server 136 may be in communication with any of the computing components of first network 110, and may function as an intermediary system to receive input content, including input electronic files and web content, from proxy server 130, e-mail server 132, file server 134, host computer 120, or firewall 140 and return, forward, or store a modified input file or modified input content according to the example embodiments. In some embodiments, content disarm server 136 may be configured as a security gateway and/or an edge device to intercept electronic communications entering a network.

Content disarm server 136 may also be configured to perform one or more malware detection algorithms, such as a blacklist or signature-based malware detection algorithm, or other known behavior-based algorithms or techniques for detecting malicious activity in a monitored run environment, such as a "sandbox," for example. Accordingly, content disarm server 136 may include or may have access to one or more databases of malware signatures or behavioral characteristics, or one or more blacklists of known malicious URLs, or other similar lists of information (e.g., IP addresses, hostnames, domains, etc.) associated with malicious activity. Content disarm server 136 may also access one or more other service providers that perform one or more malware detection algorithms as a service. In some embodiments, one or more malware detection algorithms may be implemented together with the disclosed techniques to detect any malicious content included in input content. For example, one or more malware detection algorithms may be implemented to first screen input content for known malicious content, whereby the example embodiments are then implemented to disarm any malicious content that may have been included in the input content and that may not have been detected by the one or more malware detection algorithms. Likewise, content disarm server 136 may also be configured to perform one or more algorithms on received input content for identifying suspicious content.

In some embodiments, content disarm server 136 and or file server 134 may include a dedicated repository for storing original input content (and/or characteristics thereof) received by content disarm server 136. The dedicated repository may be restricted from general access by users or computers of network 110. The dedicated repository may be a protected storage or storage area that may prevent any malicious content stored therein from attacking other computing devices of the computer system. In some embodiments, all or select original input content may be stored in the dedicated repository for a predetermined period of time or according to a policy of a network administrator, for example. In some embodiments, characteristics associated with the original input content, such as a hash of an input content file, or a URL of requested web content, or other identifiers, etc., may be stored in addition to or instead of the original input content.

Proxy server 130 may include one or more proxy servers, which may refer to any type of computing component or system for handling communication requests between one or more interconnected computing devices of network 110. In some embodiments, proxy server 130 may be configured as one or more edge servers positioned between a private network of first network 110, for example, and public network 150.

E-mail server 132 may include one or more e-mail servers, which may refer to any type of computing component or system for handling electronic mail communications between one or more interconnected computing devices of network 110 and other devices external to network 110. In some embodiments, e-mail server 132 may be configured as one or more edge servers positioned between a private network of first network 110, for example, and public network 150.

First network 110 may also include one or more firewalls 140, implemented according to any known firewall configuration for controlling communication traffic between first network 110 and network 150. In some embodiments, firewall 140 may include an edge firewall configured to filter communications entering and leaving first network 110. Firewall 140 may be positioned between network 150 and one or more of proxy server 130 and e-mail server 132. In the embodiment shown, proxy server 130, e-mail server 132 and firewall 140 are positioned within first network 110, however, other configurations of network 110 are contemplated by the present disclosure. For example, in another embodiment, one or more of the proxy server 130, e-mail server 132 and firewall 140 may be provided external to the first network 110. Any other suitable arrangement is also contemplated. Additionally, other networking components, not shown, may be implemented as part of first network 110 or external to network 110 for facilitating communications within the first network 110 and with other external networks, such as network 150.

When original input content is digitally signed, the disclosed embodiments may implement the functionality of authentication service 170a and/or 170b. Authentication service 170a may include one or more entities or services that represent a third party authentication service accessible via network 150, for example, whereas authentication service 170b may include one or more entities or services that represent an authentication service dedicated to or associated with network 110 or otherwise trusted by network 110. In some embodiments, authentication service 170b may include an administrator of network 110 or may be controlled by an administrator of network 110. Authentication service 170a may be substantially similar to authentication service 170b, and in some embodiments, may represent the same service or set of services. Authentication services 170a and 170b may be any one or more services and/or entities providing functionality for validating a digital signature associated with original input content received by a component of network 110. In some embodiments, authentication services 170a and 170b may function as a trusted service capable of creating a digital signature, managing authentication keys or other credentials, as well as authenticating a digital signature such as by verifying authenticity of a sender of received input content as well as the integrity of the received input content. In some embodiments, authentication services 170a and 170b may function as a certificate authority for generating a digital certificate, such as one corresponding to the X.509 format, for example, that provides for the creation and verification of a private/public key pair for example. In some embodiments authentication services 170a and 170b may include or may be associated with a timestamp server for verifying a timestamp of a digital signature. Any known authentication service and related services providing these or similar functionalities may be implemented in the disclosed embodiments.

The processes of the example embodiments may be implemented at any one of the computing devices or systems shown in FIG. 1, including host computer 120, 122, proxy server 130, e-mail server 132, file server 134, content disarm server 136, firewall 140, cloud server 165, and authentication service 170a, 170b.

Figure 2:
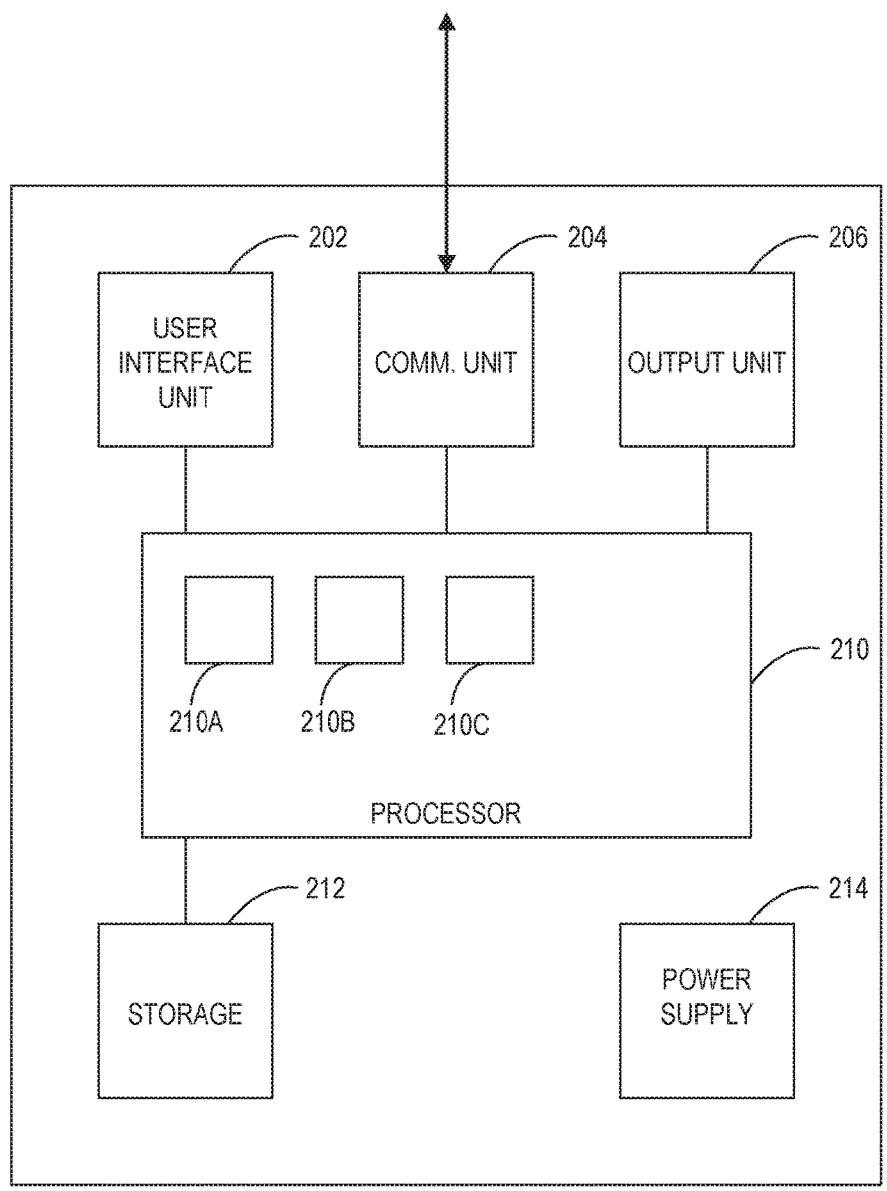
FIG. 2 is a schematic block diagram of an example computing system adapted to perform aspects of the disclosed embodiments.

Reference is now made to FIG. 2, which is a schematic block diagram of an example computing system 200 adapted to perform aspects of the disclosed embodiments. According to the example embodiments, computing system 200 may be embodied in one or more computing components of computing environment 100. For example, computing system 200 may be provided as part of host computer 120,122, proxy server 130, e-mail server 132, file server 134, content disarm server 136, cloud server 165, or authentication service 170a/170b, for example. In some embodiments, computing system 200 may not include each element or unit depicted in FIG. 2. Additionally, one of ordinary skill in the art would understand that the elements or units depicted in FIG. 2 are examples only and a computing system according to the example embodiments may include additional or alternative elements than those shown.

Computing system 200 may include a controller or processor 210, a user interface unit 202, communication unit 204, output unit 206, storage unit 212 and power supply 214. Controller/processor 210 may be, for example, a central processing unit processor (CPU), a chip or any suitable computing or computational device. Controller/processor 210 may be programmed or otherwise configured to carry out aspects of the disclosed embodiments.

Controller/processor 210 may include a memory unit 210A, which may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable computer-readable memory units or storage units. Memory unit 210A may be or may include a plurality of possibly different memory units.

Controller/processor 210 may further comprise executable code 210B which may be any executable code or instructions, e.g., an application, a program, a process, task or script. Executable code 210B may be executed by controller 210 possibly under control of operating system 210C. For example, executable code 210B may be an application that when operating performs one or more aspects of the example embodiments. Executable code 210B may also include one or more applications configured to render input content, so as to open, read, edit, and otherwise interact with the rendered content. Examples of a rendering application include one of various Microsoft® Office® suite of applications, a PDF reader application or any other conventional application for opening conventional electronic documents, as well as a web browser for accessing web content.

User interface unit 202 may be any interface enabling a user to control, tune and monitor the operation of computing system 200, including a keyboard, touch screen, pointing device, screen, and audio device such as loudspeaker or earphones.

Communication unit 204 may be any communication supporting unit for communicating across a network that enables transferring, i.e. transmitting and receiving, digital and/or analog data, including communicating over wired and/or wireless communication channels according to any known format. Communication unit 204 may include one or more interfaces known in the art for communicating via local (e.g., first network 110) or remote networks (e.g., network 150) and or for transmitting or receiving data via an external, connectable storage element or storage medium.

Output unit 206 may be any visual and/or aural output device adapted to present user-perceptible content to a user, such as media content. Output unit 206 may be configured to display web content or, for example, to display images embodied in image files, to play audio embodied in audio files and present and play video embodied in video files. Output unit 206 may comprise a screen, projector, personal projector and the like, for presenting image and/or video content to a user. Output unit 206 may comprise a loudspeaker, earphone and other audio playing devices adapted to present audio content to a user.

Storage unit 212 may be or may include, for example, a hard disk drive, a floppy disk drive, a Compact Disk (CD) drive, a CD-Recordable (CD-R) drive, solid state drive (SSD), solid state (SD) card, a Blu-ray disk (BD), a universal serial bus (USB) device or other suitable removable and/or fixed storage unit. Data or content, including user-perceptible content may be stored in storage unit 212 and may be loaded from storage 212 into memory unit 210A where it may be processed by controller/processor 210. For example, memory 210A may be a non-volatile memory having the storage capacity of storage unit 212.

Power supply 214 may include one or more conventional elements for providing power to computing system 200 including an internal batter or unit for receiving power from an external power supply, as is understood by one of ordinary skill in the art.

Figure 3:
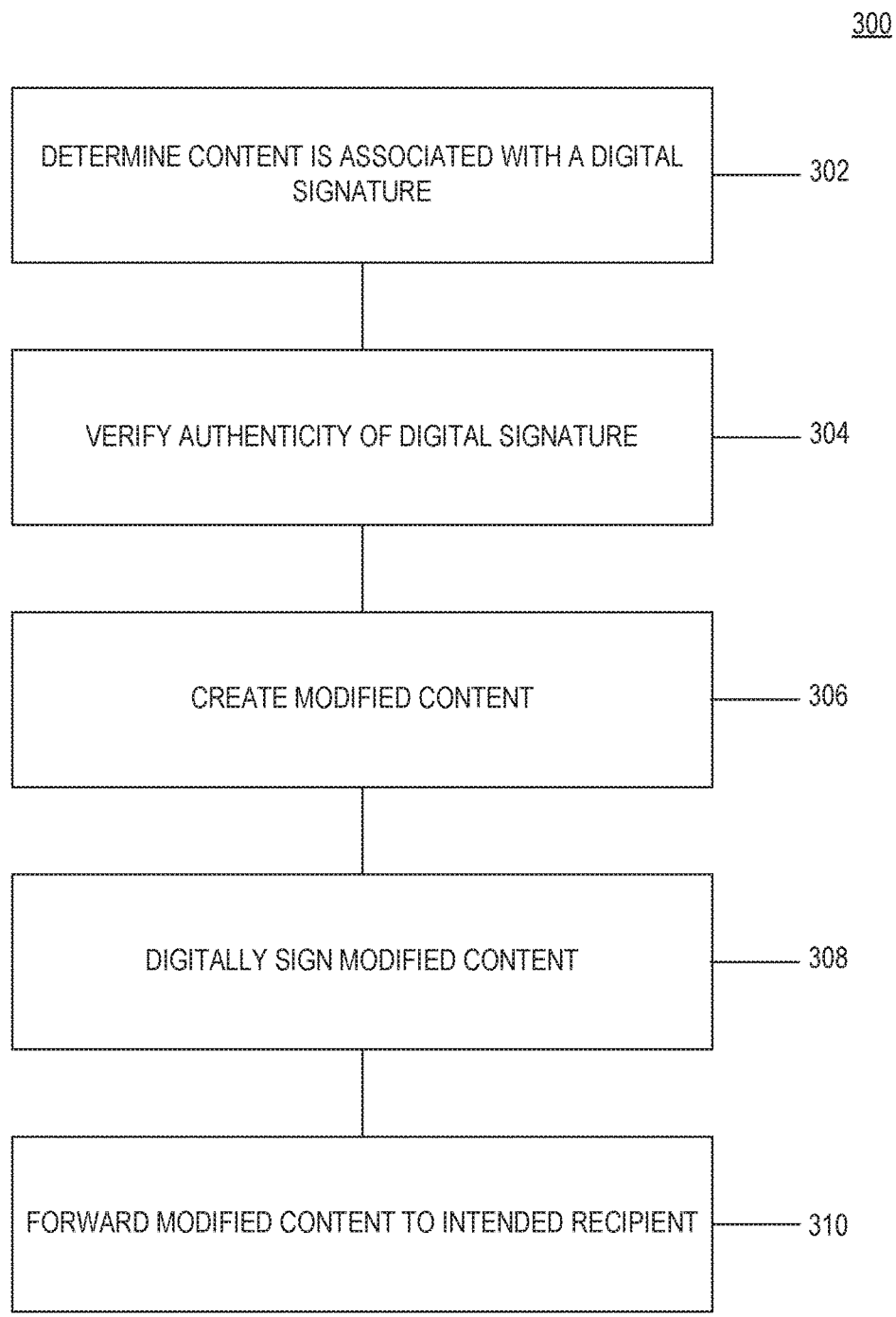
FIG. 3 is a flowchart of an example process for modifying digitally signed input content, consistent with the disclosed embodiments.

Reference is now made to FIG. 3, which is a flowchart of an example process 300 for modifying received original input content, which in the disclosed embodiments may include an input file or document received or accessed in an electronic communication. In some embodiments, the received original input content may include an e-mail communication. In the disclosed embodiments, the received original input content may include a digital signature or may be associated with a digital signature. According to the example embodiments, implementation of process 300 may disarm or neutralize or otherwise prevent malicious content in received original input content, in whatever form, from being passed on to an intended recipient or computing device and may maintain advantages of a digital signature associated with the input content. Such advantages of a digital signature include capabilities for assuring an intended recipient of the authenticity of the sender of the original input content, as well as the integrity of the content of the original input content.

In an example embodiment, the input content is originally received or accessed by a computing system, such as computing system 200, which may be included in any of the computing elements in computing environment 100, including host computer 120, 122, proxy server 130, e-mail server 132, file server 134, content disarm server 136 or cloud server 165, for example. In some embodiments, for example, the input content is received by a host computer 120, 122 that may be operated by an end-user. In other embodiments, the input content may be intended for host computer 120, 122 (or requested by host computer 120, 122) and is received by an intermediary computing system, such as proxy server 130, e-mail server 132, or firewall 140. In some embodiments, the input content may be received by a file server 134 or cloud server 165. Additionally, or alternatively, the input content may be received or accessed by content disarm server 136, from any of the computing components within network 110 or in communication with network 110.

The input content may be received or accessed by computing system 200 by any means known in the art, including such as by importing locally via an external storage device, downloading or otherwise receiving from a remote web-server, file server, or content server, for example, or by receiving via e-mail or a web browser or any other means for accessing or receiving content. An input file may be a file received or requested by a user of a computing system or other files accessed by processes or other applications executed on a computing system that may not necessarily be received or requested by a user of the computing system.

Received content or input content according to the disclosed embodiments may include any form of electronic content, including a file, document, an e-mail, downloaded web content, etc., or other objects that may be run, processed, opened or executed by an application or operating system of the victim computer or computing device, and may be associated with a digital signature. Malicious content can be embedded among seemingly legitimate received content or input content. An input file according to the disclosed embodiments may include any file or file-like content, such as an embedded object or script, that is processed, run, opened or executed by an application or operating system of a computing system. Input content may include electronic mail, for example, or streamed content or other web content. Thus, while some embodiments of the present disclosure refer to an input file or document, the disclosed techniques are also applicable to objects within or embedded in an input file or to input content generally, without consideration as to whether it can be characterized as a file, document, or object.

According to some embodiments, one or more rules may be applied by the receiving computing system (or other intermediary computing system) to content or files according to known techniques for identifying trusted or potentially suspicious or malicious input files or otherwise suspicious or malicious content. For example, a preliminary analysis of a file or other content may include determining the source of the file, the file type, file structure, the process accessing the file, or any other characteristics associated with the file that may enable a determination as to a potential for a file to include malicious content. A preliminary analysis is optional, but in some embodiments it may be useful to first screen content for malicious content or characteristics known or suspected to be associated with malicious content or activity or otherwise suspicious content, without regard to whether it is associated with a digital signature.

The disclosed embodiments may be implemented with respect to any and all content identified in a document, file, or other received input content, without regard to whether the content or the document itself is deemed suspicious in advance or before the sanitization or modification is performed. Suspicious content may or may not include malicious content. Suspicious content refers, for example, to a situation where input content may potentially or more likely include malicious content, such as when the received content comes from or is associated with an untrusted source. Content may be deemed suspicious based on one or more characteristics of the received input content itself or the manner in which it is received, as well as other factors that alone or together may cause suspicion. One example of a characteristic associated with the input content refers to an authorship property associated with the input content. For example, the property may identify an author of the input content and the system determines whether the author property matches the source from which the input content was received and if there is no match then the system marks the input content as suspicious.

In the example embodiments, however, any malicious or suspicious content included in a file or content can be disarmed without having first detected possible or suspected malicious or suspicious content. That is, it is not necessary to first detect any malicious or suspicious content in the content in order to disarm the malicious content. In some embodiments, one or more malware detection techniques may be implemented together with the exemplary embodiments, but knowledge or awareness of suspected malicious or suspicious content is not required to disarm any malicious content that may be included in the input content. In some embodiments, the disclosed techniques may be performed when one or more malware detection techniques do not identify suspicious content or suspected malicious content in received input content. In some embodiments, received input content that is determined to include malicious content may be quarantined or otherwise blocked from being accessed by a user. Alternatively, in some embodiments, upon identifying suspicious or malicious content, various CDR processes may be performed to disarm the identified malicious content that may be included in the input content. Additionally, in some embodiments, if malicious content is identified, the example embodiments may include functionality for destroying such content that is known to be malicious, in lieu of performing a disarming process. In some embodiments, any received content determined to include malicious content may be quarantined or blocked, so as not to be accessed by the intended recipient altogether. One or more other known content screening or analysis techniques and policies or rules for evaluating the input content may be implemented in addition to those expressly described in the example embodiments.

The performance of particular aspects or operations of process 300 may be determined based on one or more policies or rules configured for computing system 200. For example, whether or not each step of process 300 is performed may be determined based on one or more policies or rules. The policies or rules may be based on a number of known factors, some of which may be enterprise specific. Thus, the example embodiments for disarming input content are not limited to any particular enterprise computing environment or implementation, and can be implemented as a standalone solution or a suite of solutions, and can be customized according to preferences of a computing environment.

At operation 302, the received or accessed original input content may be inspected or analyzed to determine that the input content is associated with one or more digital signatures. For some file types, for example, it is possible to append multiple digital signatures to a single document, and where each may be associated with a different signer. While the example embodiments describe operations with respect to a digital signature, similar operations may be performed for each or some of a plurality of digital signatures associated with the input content.

In some embodiments a digital signature may be appended to the received input content or received together with the input content, or the input content may include a wrapper associated with a digital signature, or the input content may otherwise be associated with a digital signature. In the example embodiments, a digital signature may be associated with the input content according to any number of known techniques. In the example embodiments, the input content is inspected for the presence of, or association with, a digital signature without rendering or opening the input content, so as to prevent an attack on the computing system based on any malicious content that may be included in the input content. In some embodiments, the input content may be opened or rendered in a sandbox or sandbox type environment for determining an association with a digital signature, while protecting the computing system and network from any attack or threat posed by any malicious content that may be included in the input content.

At operation 304, responsive to determining that the input content is associated with a digital signature, computing system 200 may perform one or more operations to verify the authenticity of the digital signature. In some embodiments, computing system 200 may coordinate or communicate with an authentication service 170a or 170b to perform the one or more operations for verifying authenticity of the digital signature. In some embodiments, operations for verifying the authenticity of the digital signature may vary based on the type or nature of the digital signature. In some embodiments, the authenticity of the digital signature may not be verified at all, at least not initially. As described in detail below, the disclosed embodiments include capabilities for later verifying the authenticity of the digital signature if desired.

In some embodiments, a digital signature may include encrypted content, or an encrypted hash, digest, or other unique characteristics of the input content. The digital signature may be based on an encryption key or other credential uniquely identifying or associated with a signer/sender of the input content. In some embodiments, the encryption key may correspond to a "private" key according to an asymmetric key encryption algorithm. The digital signature may include a corresponding "public" key that may be used to decrypt the encrypted portions of the digital signature or otherwise include information identifying the "public" key that may be used to decrypt the encrypted portions of the digital signature. In some embodiments, the public key may be received as part of a certificate identifying the entity associated with the private key, a time frame for which the key or the certificate is valid as well as other information, control parameters, etc. In some embodiments, the certificate may be configured according to the X.509 standard for public key certificates. The digital signature may also include information identifying a hashing algorithm or other algorithm used to create a hash, digest or other uniquely identifying characteristic of the received content, as well as a timestamp identifying a time when a digital signature is created. Based on the well-known properties of public-key encryption and a hashing algorithm, for example, computing system 200 can determine that a private key associated with a particular sender was used to encrypt portions of the digital signature, and determine whether the content is free of any modifications or alterations.

In the example embodiments, computing system 200 may include capabilities for decrypting the encrypted portions of a digital signature based on a received or accessed public key. Computing system 200 may also include capabilities for calculating a hash or digest of the received input content for use in comparison with the decrypted portions of the digital signature. If a decrypted hash included in the digital signature, for example, matches a calculated hash of the input content, then computing system 200 can be reasonably assured that the received input content has not been altered since generation of the digital signature. Although computing system 200 may include these capabilities, one or more of the required steps for verifying authenticity of a digital signature may also be performed by an authentication service 170a or 170b.

Thus, in some embodiments, steps for verifying authenticity of a digital signature may include receiving an indication from a trusted entity or trusted third party that includes information indicative of the authenticity of the digital signature or other information for which an authenticity can be determined. In some embodiments steps for verifying authenticity of a digital signature may include verifying a chain of trust of a certificate chain or an ordered list of certificates associated with the digital signature up to a root certificate signed by a certificate authority, for example. In some embodiments, computing system 200 may access an authentication service 170a/170b for performing these and other verification functionality via an application programming interface associated with the service. In some embodiments, authentication service 170a/170b may be implemented to verify the validity and authenticity of the private key used to generate the digital signature and the public key associated with the private key. Authentication service 170a/170b may also include functionality for verifying a timestamp associated with a digital signature or accessing a timestamp server, for example, to verify the timestamp and/or to verify a validity of a private key at the time of the signing. Authentication service 170a/170b may also correspond to a certificate authority or other trusted entity capable of verifying validity of a private key used to encrypt portions of the digital signature as well as verify the association of the private key with a particular sending entity. In this regard, authentication service 170a/170b may include capabilities for managing asymmetric key pairs, etc. according to one or more techniques known in the art. In some embodiments, authentication service 170b may correspond to or be controlled by an administrator of network 110, that may include capabilities for verifying authenticity of or otherwise approving a digital signature.

In some embodiments, a determination of the authenticity of the digital signature may be based on one or more rules or policies associated with computing system 200 or network 110, for example. In some embodiments, a policy may control approval or authentication of a digital signature based on a characteristic of a certificate associated with the digital signature, such as an identity of a certificate authority, a period of existence, a time period for validity, or other parameter included in or associated with the certificate, including the presence of a certificate on a certificate revocation list. In some embodiments, the one or more policies may be applied based on information associated with a digital signature and/or the input content without necessarily validating or verifying the digital signature. For example, in some embodiments, one or more policies may be selectively applied depending on an identity or domain of a sender and/or signer associated with the received content or contained in a digital signature, for example, without necessarily verifying the identity. In some embodiments, for example, the sender/signer or domain of the sender/signer may be determined to be trusted based on one or more policies or other patterns of communications or other statistical or analytical measures without verifying the digital signature.

In some embodiments, computing system 200 may determine whether to create modified input content based on the received input content, responsive to verifying authenticity of a digital signature in operation 304, if the authenticity is determined. In some embodiments, an enterprise policy may determine that validation of the digital signature provides reasonable assurance that the received input content is to be trusted, and thus may determine not to create modified input content. This may be especially true when the digital signature validates a sender trusted by the computing system. However, it may be advantageous to perform one or more CDR or data sanitization operations on the received content without regard to the identity of the sender or a determined validity of the signature. This is especially true because there can be little assurance that the private key associated with a sender has not been misappropriated by a malicious actor, or that a trusted sender may unwittingly send malicious content. Thus, the example embodiments may create modified input content even when the authenticity of a digital signature purportedly has been validated or verified. Additionally, in some embodiments, modified input content may not be created and the input content may be quarantined or discarded if the authenticity of the digital signature cannot be validated or verified. In some embodiments, a determined reason for the digital signature failing verification may be considered when determining whether to create modified input content.

Computing system 200 may execute a program or instructions or otherwise perform a process to disarm any malicious content that may be included in the input content, thereby creating modified input content (Operation 306.) Any one or more CDR techniques, such as those identified above, or other techniques for modifying or transforming input content so as to prevent malicious content from being received by an intended recipient may be implemented. For example, in some embodiments, a modified input file may be created to include modified payload content in place of the original payload by changing the values of the underlying payload data units of the input content, such as according to the techniques of U.S. Pat. No. 9,047,293 and U.S. patent application Ser. Nos. 15/441,860 and 15/441,904, the contents of which are expressly incorporated herein. In some embodiments, the modified input content may include other structural changes to the received input content. For example, a header of a received input content or file may be changed in a modified input content or file. A modified input file may also be encoded or compressed or undergo any number of other changes to a structure, layout, or format of the input content, without preventing materially similar uses and functionality as the received input content. In some embodiments, computing system 200 may modify one or more aspects of the received input content, or all aspects. In some embodiments, computing system 200 may modify the input content according to one or more techniques for generating a visual representation of the input content.

In some embodiments, the particular disarming technique implemented may be based on the type of input content received. Thus, as part of operation 306, computing system 200 may read, scan, or parse the data units of the received input content according to techniques known in the art to determine the type or structure of the received input content. In some embodiments, operation 306 may include additional operations for determining other characteristics of the input content to aid the disarming process for creating modified input content.

In some embodiments, a reading, scanning or parsing process may be performed without invoking an execution engine such as application software of the computing system 200 for rendering the input content. For example, in some embodiments, computing system 200 does not render the input content, as such rendering of input content may result in triggering execution of malicious content. In an example embodiment, input content may include one or more input files or objects etc. In such an embodiment, each distinct file, object, or content of the received input content may be parsed one by one in separate iterative processes to identify any malicious content included in received input content. In other embodiments, aspects of operation 306 may be performed in an isolated or monitored environment such as a sandbox or sandbox type environment. Other transformation or modification techniques may also be implemented to create modified input content.

In some embodiments, as part of operation 306, the modified input content is created as a new file or document or email or other representation, distinct from the received original input content. In some embodiments, the modified input content is configured to be rendered by a user using a rendering application just as (or similar as) the received input content would be rendered by the user. In some embodiments, the modified input content may also be configured to enable full functionality or intended use as the received original input content.

Because the modified input content resulting from operation 306 includes at least one change from the original received input content, the digital signature associated with the original input content is no longer capable of validating the integrity of the content of the original input content. As part of operation 306, however, additional content features may be inserted into or added to the modified input content that provide a similar advantage as the digital signature associated with the original input content. For example, in some embodiments, new or additional content may be added to the modified input content indicating that the contents and/or sender of the original input content have been validated by the computing system and/or authentication service based on a digital signature associated with the original input content. The content features may include elements inserted into the modified content itself, or alternatively, may be displayed within an electronic communication associated with the modified input content. The content features may be configured to be displayed or otherwise provided to the intended recipient upon receipt of the modified input content or rendering of the modified input content.

In some embodiments, other content features may also be added such that an intended recipient can distinguish modified input content from other content, such as the original input content. For example, in some embodiments a notification may be added to an electronic communication or other associated content indicating that the original input content has undergone processing to disarm malicious content, or has otherwise been modified. Thus, an additional notification feature may include elements inserted into the modified content itself, or alternatively, may be displayed within an electronic communication associated with the modified input content.

In some embodiments, whether or not additional content elements are added to the modified input content, the modified input content may be stripped of any digital signature that may be been included in or appended to the original input content. In other embodiments, the modified input content may include any digital signature associated with the original input content whether validated or not. In some embodiments, the modified input content may include one or more data elements associated with the digital signature, such as an identity of the purported signer, a location or domain of the signer, or a timestamp or other uniquely identifying information. Such data elements may be inserted into the modified input content or otherwise associated with the modified input content.

Responsive to creating the modified input content as part of operation 306, computing system 200 may determine whether to digitally sign the modified input file, as part of operation 308. As with other steps of process 300, performance of operation 308 is optional and it may be determined based on one or more configurable policies of computing system 200 or network 110. In some embodiments, operation 308 may be based on the identity of a sender or recipient or based on the nature or characteristic of the original input content. In some embodiments, performance of operation 308 may be predetermined or individually selectable by an administrator of network 110 or upon request by an intended recipient or other requesting entity.

A digital signature may be applied or associated with the modified input content. A digital signature created, for example, as part of operation 308 may be of the same or similar form as the digital signature associated with the original input content or may include any type of digital signature providing one or more of the capabilities for verifying integrity of the contents of the modified input file, or for verifying an identity of a sender, or for confirming a chain of possession of the modified input content. In some embodiments, a digital signature created as part of operation 308 may serve to verify the identity of a network administrator of network 110 or a security gateway of network 110 or other entity trusted by network 110 or computing system 200. In this regard, any one or more techniques may be implemented, such as the use of a private/public key encryption algorithm or other security certificate for example. The digital signature created in operation 308 may also include capabilities for verifying the contents of the modified input content based on a hash or other uniquely identifying characteristic. Additionally, a digital signature created as part of operation 308 may also include additional information identifying a particular CDR technique implemented to create the modified input content, or a report identifying one or more changes to the input content, as well as other information corresponding to the digital signature associated with the original input, such as the digital signature itself, information verifying the authenticity of the original digital signature, a name of the signer, date of the original signing, location information associated with the signing, or other comments associated with the signing.

The modified input content may be provided or forwarded to a recipient computing device such as host computer 120, 122, or a file server 134 or other computing device of computing environment 100. In some embodiments, the modified input content may include an attached or appended digital signature, such as that generated in operation 308. Operation 310 may be performed in those embodiments where process 300 is performed by a computing device or system other than an intended recipient of the input content, for example. In some embodiments, operation 310 may be performed before operation 308, such as when operation 308 is not performed. Additionally, in some embodiments, a digital signature may be generated in operation 308 without initially providing the digital signature to the intended recipient, which may be later requested upon demand, for example. In embodiments where process 300 is performed at a host computer 120, 122, for example, operation 310 may not be performed. Additionally, in some embodiments, modified input content may be forwarded to one or more other computing devices or systems intermediate or alternative to an intended recipient computing device. In the example embodiments, the modified input content may be rendered at the recipient computing device to a human user using known rendering applications for interacting with the input content, or may otherwise be accessed, opened, processed, stored, etc. at the recipient computing device by the user or other process executing at the recipient computing device.

Computing system 200 may associate the modified input content and any newly generated digital signature with the received original input content and any digital signature associated with the original input content. In some embodiments, all or certain types of the received original input content, a copy thereof, or other characteristic (e.g., a hash, URL, any other identifier, etc.) of the original input content, as well as an associated digital signature may be stored and/or logged in a dedicated repository or protected storage area, such as part of file server 134, content disarm server 136, cloud server 165, or one or more other databases or storage systems. Once created as a result of operation 306, the created modified input content (and any digital signature created as part of operation 308) may be stored or indexed together with the original received original input content in the document repository or protected storage area, or otherwise associated with the original input content. The modified input content created for each of the stored and logged original input content may be associated with the original input content according to any number of techniques available in the art. For example, the modified input content or an identifier of the created modified input content may be stored in association with the original input content or otherwise linked with the original input content. Other techniques are contemplated that generally establish an association between an original input content and a modified input content. An example interface illustrating an association between original input content and modified input content according to an example embodiment is shown in and described below with respect to FIG. 4.

As described above, the dedicated repository may be isolated or otherwise secured or protected to prevent general access to the original input content stored therein and/or to prevent any malicious content that may be included in the original input content to affect other computing elements of a computer system. Thus, in the disclosed embodiments, the original input content may be quarantined such that it does not pose an active threat to a computer system. In some embodiments, however, the original content may be released (selectively or automatically) to certain users or intended recipients according to one or more policies of the computer system. Thus, by storing the original input content, as well as any associated digital signature, an intended recipient or other user may be able to retrieve such original content at a later time if the original content is determined to be safe or "trusted" according to one or more procedures or policies, or is otherwise required by a requesting entity. Upon request to an administrator, for example, the original input content and any associated digital signature may be obtained by a requesting user, such as the intended recipient, or other requesting entity that may be authorized to access such content according to policy of the enterprise, for example.

In some embodiments, a requesting user may be required to answer one or more prompts or pre-defined questions as part of the request or in response to requesting the release of original content. The one or more prompts maybe configured based on a prior determination as to whether a digital signature associated with the original input content was able to be verified or authenticated. An individual, such as an administrator, or automated system may then determine whether to release the original input content based at least in part on the user's responses, as well as other characteristics of the original input content and the authenticity of the digital signature. The pre-defined prompts may include an indication that a sender's identity may or may not have been authenticated based on a digital signature. Some example prompts may include "were you expecting that file?" or "are you familiar with the sender?" etc. In some embodiments, the pre-defined prompts or questions may be tailored based on one or more characteristics of the original input content.

In some embodiments, computing system 200 may be configured to automatically release original input content or replace modified input content with the original content if or once the original input content is determined to be safe. In some embodiments, authentication of a digital signature may be sufficient to deem the original content safe, in others the content may be deemed safe based on one or more malware detection techniques or based on other policies associated with computing system 200. In some embodiments, once the original content is determined to be safe or "trusted", the original input content may be automatically forwarded to the intended recipient or the intended recipient may otherwise be notified that the original input content is accessible to the intended recipient.

In some embodiments, each input file or each input file of a predetermined type, etc., or all original input content or input content having certain characteristics that is received by a computing system 200 may be processed according to an example process 300, without regard to the characteristics of the input files and input content, such as an identity of a sender or recipient. In some embodiments, one or more malware detection algorithms may first be applied to the received input content and operation 304 or 306 etc. is performed only if no suspicious or malicious content is detected. This is advantageous because the disclosed embodiments do not assume that any input content is safe or trusted, based on a preliminary analysis of the input file (if performed) or otherwise. This improves the likelihood of disarming malicious content that may be included in the input content without knowledge by the sender, and for disarming malicious content that may go undetected by conventional malware detection techniques.

Reference is now made to FIG. 4 which illustrates an aspect of the disclosed embodiments including an interface for associating received original input content with modified input content, subsequent to completion of example process 300 or aspects thereof. An example interface 400 of a computing system for use in the disclosed embodiments is shown in FIG. 4. In some embodiments, example interface 400 is configured to display a plurality of records 402 or data items representative of a plurality of original input content that is received by the computer system, such as prior to or part of operation 302. The plurality of records may be associated with or represent original input content stored in a dedicated repository or protected storage area, for example. The original input content may also be associated with modified input content that may be provided to an intended recipient in lieu of the original input content, as described above with respect to operations 306, 308, and 310.

As shown in FIG. 4, an example record 402 may include a number of data items pertaining to received input content in the form of an electronic message or email. Example record 402 may be assigned a unique identifier, such as that shown in column 404, and may include a date and time the email is received by the system (406), a user name or email address of a sender of the email (408), an email address of the intended recipient (410), and a comment or subject of the email communication (412). Additionally, in the example embodiment, each received email input content is associated with a modified (e.g., disarmed or sanitized) email content identified by a file name of the modified file (414) and a link to the modified file (415). In some embodiments, the modified file includes a newly created digital signature, such as that described above with respect to operation 308. An example record 402 may also include a link to the original received input content or file (416), which may also include a digital signature associated with the original received input content, such as that described above with respect to operation 302.

In some embodiments, interface 400 may enable additional functionality to identify a status of the original input content (column 418), and a selectable option (column 420) to enable an administrator, for example, to release original input content as described above. As shown with respect to column 418, in some embodiments interface 400 may be configured to indicate a status identifier, such as an icon, that indicates one or more degrees of trustworthiness of received original content. In some embodiments, a status identifier may be based on the ability of the computing system to verify the authenticity of a digital signature associated with the original input content, such as is described above with respect to operation 304. For example, as shown, one type of icon may present a warning that the content cannot be trusted, which may be based on an inability to verify authenticity of a digital signature. Such a warning may be cautionary based on one or more characteristics of the original input content, such as an expired certificate associated with the digital signature, for example. In some embodiments, a cautionary icon may not necessarily represent that the original input content includes malicious content, but that the original input content is unable to be currently verified as safe or trusted. Another example icon, such as the smiley face icon shown, may indicate that the original input content may be trusted. The content may be "trusted" based on the characteristics of the input content or based on one or more analysis performed on the input content including a determination that a digital signature associated with the input content has been verified or authenticated. Another example icon may indicate that the original input content has been determined to be unsafe. Such a determination may be based on an analysis of the original input content, which resulted in a determination that the original input content includes malicious content. In some embodiments, as shown, when the original input content is determined to be unsafe, an administrator may not be able to release the original input content to a requesting user or intended recipient, or may otherwise be warned before doing so.

In some embodiments, interface 400 may also include a link to access any other of various additional details that may be applicable to a particular embodiment. While the interface 400 is shown with respect to received original input content in the form of email, similar interfaces may be adapted for various other types of received input content. Additionally, each of the data elements or other selectable options and features illustrated is by example only. Greater or fewer other data elements may be associated with each received content, and less or additional functionality may be enabled.

As also shown in FIG. 4, example interface 400 may provide one or more selectable options for an administrator to manage aspects of the disclosed embodiments. For example, a first selectable option 422 may enable an administrator to filter the records by report, a second selectable option 424 may enable the administrator to approve selected items to be released to an intended recipient, for example, a third selectable option 426 may enable the administrator to reject selected items, e.g., to remove selected items from the system altogether to preclude any eventual release of the original content to an intended recipient. Another selectable option 428 may enable an administrator to analyze selected items. In some embodiments, the example interface 400 may enable the administrator to analyze selected items, both original content and modified content, to perform various analytical operations on the content for forensic purposes such as to examine malicious content, for example. In some embodiments selectable option 428 may enable an administrator to verify a digital signature associated with received input content or modified input content or to generate a digital signature for modified input content. Based on other analytical operations, a supervisor may be able to determine the extent of modifications included in the modified content and how any malicious content included therein may have been disarmed. Additionally, in some embodiments, an administrator may trigger a retrospective analysis of one or more original content items based on selection of option 428, for example, or other inputs associated with an original content item. Example processes for performing a retrospective analysis of original input content are described in U.S. patent application Ser. No. 15/672,037, filed Aug. 8, 2017, the contents of which are expressly incorporated herein.

The foregoing description describes example embodiments for performing a retrospective analysis of original input content in systems that generate modified input content. The above techniques, however, may also be applied for systems that do not generate modified input content. Additionally, any of the several techniques may be combined in any one embodiment depending on the nature of the input content, and one or more network or enterprise rules or policies, for example. The example embodiments therefore may enable a system or user to verify the effectiveness of one or more content modification techniques as well as to determine when potential malware attacks may have been prevented by the implemented systems.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. Thus, while certain features of the example embodiments have been illustrated and described herein, many modifications, substitutions, changes, and equivalents will be apparent to those of ordinary skill in the art. It is, therefore, to be understood that the appended claims are intended to cover all such modifications and changes as fall within the true spirit of the invention.

The claims are to be interpreted broadly based on the language used in the claims and not limited to examples described in the present specification, which are non-exclusive. For example, aspects of the disclosed embodiments are described as operations performed by a computing system, and one skilled in the art will appreciate that these aspects can be configured as a set of instructions stored on and executed from many types of tangible computer-readable media, such as secondary storage devices, like hard disks, floppy disks, or CD-ROM, or other forms of RAM or ROM.

What is claimed is:

1. A method for disarming malicious code in digitally-signed content in a computer system having a processor, the method comprising:
    determining, by the processor, that content is associated with a first digital signature;
    modifying, by the processor, at least a portion of digital values of the content to disable any malicious code included in the content, thereby creating modified content; and
    signing, by the processor, the modified content with a second digital signature, thereby creating signed modified content, the signed modified content including a data element corresponding to the first digital signature.

2. The method of claim 1, wherein the content is received by the computer system and intended for a recipient in a network, the method further comprising enabling access to the modified content by the intended recipient.

3. The method of claim 1, further comprising verifying, by the processor and before the modifying, authenticity of the first digital signature.

4. The method of claim 3, wherein verifying the authenticity of the first digital signature includes receiving an indication from a trusted third party indicative of the authenticity of the first digital signature.

5. The method of claim 3, wherein verifying the authenticity of the first digital signature includes approving the first digital signature based on a policy associated with the computer system.

6. The method of claim 5, wherein the policy enables approval of the first digital signature based on a characteristic of a certificate associated with the first digital signature.

7. The method of claim 3, wherein verifying the authenticity of the first digital signature includes receiving an indication from an administrator of the computer system indicative of approval of the digital signature.

8. The method of claim 2, further comprising providing a notification to the intended recipient that the first digital signature of the content has been verified.

9. The method of claim 8, wherein the notification is included in content of the modified content.

10. The method of claim 8, wherein the notification is included in a communication associated with the modified content.

11. The method of claim 10, wherein the communication is an electronic message including the modified content attached thereto.

12. The method of claim 2, wherein the second digital signature is associated with a security gateway in the network.

13. The method of claim 2, further comprising:
storing the content in association with the first digital signature in a dedicated storage area of the computer system; and
enabling access to the content by the intended recipient according to a policy of the computer system.

14. A method for disarming malicious code in a computer system having a processor, the method comprising:
determining that input content associated with a recipient in a network is associated with a first digital signature;
communicating with an authentication service to verify authenticity of the first digital signature;
modifying at least a portion of digital values of the input content to disable any malicious code included in the input content, thereby creating modified input content; and
signing the modified input content with a second digital signature, thereby creating signed modified input content, the signed modified input content including one or more elements indicative of the authenticity of the first digital signature.

15. The method of claim 14, wherein the authentication service is associated with the computer system.

16. The method of claim 14, wherein the authentication service is associated with a security gateway of the network.

17. The method of claim 14, wherein the authentication service is associated with a trusted third party.

18. The method of claim 14, wherein the modifying is performed without first detecting malicious code in the input content.

19. The method of claim 14, further comprising:
storing the input content in association with the first digital signature in a dedicated storage area of the computer system; and
enabling access to the input content by the recipient according to a policy of the computer system.

20. The method of claim 14, further comprising inserting the one or more content elements into the modified input content.

21. The method of claim 14, further comprising inserting the one or more content elements into the second digital signature.

22. A non-transitory computer-readable medium comprising instructions that when executed by a processor are configured for carrying out the method of claim 14.

23. A system for disarming malicious code in digitally-signed content, the system comprising:
a memory device storing a set of instructions; and
a processor configured to execute the set of instructions to:
determine that content is associated with a first digital signature;
modify at least a portion of digital values of the content to disable any malicious code included in the content, thereby creating modified content; and
sign the modified content with a second digital signature, thereby creating signed modified content, the signed modified content including a data element corresponding to the first digital signature.

24. A system for disarming malicious code, the system comprising:
a memory device storing a set of instructions; and
a processor configured to execute the set of instructions to:
determine that input content associated with a recipient in a network is associated with a first digital signature;
communicate with an authentication service to verify authenticity of the first digital signature;
modify at least a portion of digital values of the input content to disable any malicious code included in the input content, thereby creating modified input content; and
sign the modified input content with a second digital signature, thereby creating signed modified input content, the signed modified input content including one or more elements indicative of the authenticity of the first digital signature.

* * * * *